United States Patent
Armenjon et al.

(10) Patent No.: US 11,432,568 B2
(45) Date of Patent: Sep. 6, 2022

(54) BEETLE POWDER

(71) Applicant: YNSECT, Evry (FR)

(72) Inventors: Benjamin Armenjon, Paris (FR); Nathalie Berezina, Paris (FR); Sophie Laurent, Paris (FR); Cecilia Socolsky, Paris (FR); Lorena Sanchez, Evry (FR); Antoine Hubert, Alfortville (FR)

(73) Assignee: YNSECT, Évry-Courcouronnes (FR)

( * ) Notice: Subject to any disclaimer, the term of this patent is extended or adjusted under 35 U.S.C. 154(b) by 521 days.

(21) Appl. No.: 15/541,140

(22) PCT Filed: Dec. 30, 2015

(86) PCT No.: PCT/FR2015/053785
§ 371 (c)(1),
(2) Date: Jun. 30, 2017

(87) PCT Pub. No.: WO2016/108037
PCT Pub. Date: Jul. 7, 2016

(65) Prior Publication Data
US 2018/0000121 A1    Jan. 4, 2018

(30) Foreign Application Priority Data

Dec. 31, 2014  (FR) ..................... 1463512
Oct. 20, 2015  (FR) ..................... 1560012

(51) Int. Cl.
*A23K 20/147* (2016.01)
*A23L 33/17* (2016.01)
(Continued)

(52) U.S. Cl.
CPC ............ *A23K 20/147* (2016.05); *A23K 50/80* (2016.05); *A23L 33/17* (2016.08); *C08B 37/003* (2013.01); *C08L 89/00* (2013.01)

(58) Field of Classification Search
CPC ...... A23K 33/17; A23K 20/147; A23K 10/20; A23K 40/10
See application file for complete search history.

(56) References Cited

U.S. PATENT DOCUMENTS

2003/0233982 A1    12/2003  Zhang
2008/0075818 A1    3/2008   Papadoyianis et al.
(Continued)

FOREIGN PATENT DOCUMENTS

CL    2014003470    7/2015
CL    2015002221    1/2016
(Continued)

OTHER PUBLICATIONS

Yang et al., "Nutritional Composition and Protein Quality of the Edible Beetle", J INsent Sci. 2014; 14: 139; Jan. 1, 2014. Retrieved from the Internet: URL <https://www.ncbi.nlm.nih.gov/pmc/articles/PMC4684676/> (Year: 2014).*
(Continued)

*Primary Examiner* — Stephanie A Cox
(74) *Attorney, Agent, or Firm* — Panitch Schwarze Belisario & Nadel LLP; Erin M. Dunston

(57) ABSTRACT

The present invention relates to a beetle powder containing at least 67% by weight protein and at least 5% by weight chitin, the weight percentages relating to the total weight of the beetle powder. The invention is also directed to a method for preparing the beetle powder and to the uses thereof, in particular in human or animal nutrition.

13 Claims, 3 Drawing Sheets

Figure 1:
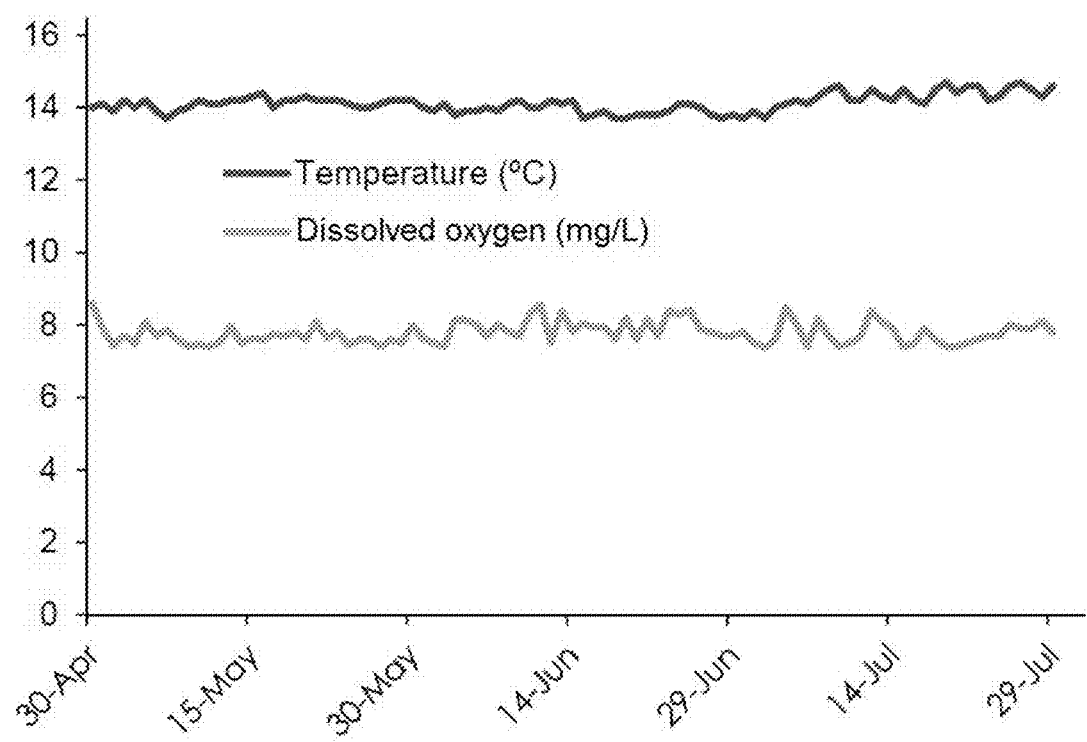

(51) Int. Cl.
C08L 89/00 (2006.01)
C08B 37/08 (2006.01)
A23K 50/80 (2016.01)

(56) References Cited

U.S. PATENT DOCUMENTS

2012/0148712 A1  6/2012  Guilfoyle et al.
2014/0100361 A1  4/2014  Le Roux et al.

FOREIGN PATENT DOCUMENTS

| | | |
|---|---|---|
| CL | 2017001751 | 3/2018 |
| CN | 1297691 | 6/2001 |
| CN | 1415757 | 5/2003 |
| CN | 101116471 | 2/2008 |
| CN | 101117613 | 2/2008 |
| CN | 101124936 | 2/2008 |
| CN | 101144097 | 3/2008 |
| CN | 101292737 | 10/2008 |
| CN | 101880591 | 11/2010 |
| CN | 101144097 | 12/2010 |
| CN | 101940270 | 1/2011 |
| CN | 102178119 | 9/2011 |
| CN | 102578361 | 7/2012 |
| CN | 103045349 | 4/2013 |
| CN | 103070314 | 5/2013 |
| CN | 103478724 | 1/2014 |
| CN | 103694372 | 2/2014 |
| CN | 103725742 | 4/2014 |
| FR | 2630008 | 10/1989 |
| JP | 2009254348 | 11/2009 |
| RU | 2345139 | 1/2009 |
| WO | WO 2004049818 | 6/2004 |
| WO | WO 2014/123420 | 8/2014 |

OTHER PUBLICATIONS

Guénot, Des insectes dans la farine, www.lejdd.fr/JDD-Paris/Actualite/Des-insectes-dans-la-farine-581928 (Dec. 19, 2012) (English translation of first paragraph attached).
Becker, Technologies for processing insect-based food ingredients, Food Technology, DTI, Insect Conference (Nov. 13, 2014).
Bukkens, The Nutritional Value of Edible Insects, 36 Ecology of Food and Nutrition 287-319 (1997).
Dreyer et al., On the Nutritive Value of Mopanie Worms, 78 South African Journal of Science 33-35 (Jan. 1982).
Eggers, High Pressure Extraction of Oil Seed, 62(8) JAOCS 1222-1223 (Aug. 1985).
Gutierrez et al., Análisis Composicional, Microbiológico y Digestibilidad de la Proteína de la Harina de Larvas de Hermetia Illuscens L (Diptera:Stratiomyiidae) en Angelópolis-Antioquia, Colombia, 57(2) Rev. Fac. Nac. Agron. Medellín 2491-2499 (2004) (English abstract provided).
Iñiguez-Covarrubias et al., Biodegradation of Swine Waste by House-Fly Larvae and Evaluation of Their Protein Quality in Rats, 6(1) Journal of Applied Animal Research 65-74 (1994).

Kroeckel et al., When a turbot catches a fly: Evaluation of a pre-pupae meal of the Black Soldier Fly (*Hermetia illucens*) as fish meal substitute—Growth performance and chitin degradation in juvenile turbot (*Psetta maxima*), 364-365 Aquaculture 345-352 (2012).
Özçimen et al., Production and characterization of bio-oil and biochar from rapeseed cake, 29 Renewable Energy 779-787 (2004).
Pretorius, The Evaluation of Larvae of Musca Domestica (Common House Fly) As Protein Source For Broiler Production, Master Thesis, Stellenbosch University (entire thesis) (Mar. 2011).
Ramos-Elorduy et al., Digestibilidad in vitro de Algunos Insectos Comestibles en Mexico, 49 Folia Entomológica Mexicana 141-154 (1981).
Vedlkamp et al., Insects as sustainable feed ingredient in pig and poultry diets—a feasibility study, Report 638 Livestock Research Wageningen UR (Oct. 2012).
St-Hilaire et al., Fish Offal Recycling by the Black Soldier Fly Produces a Foodstuff High in Omega-3 Fatty Acids, 38(2) Journal of the World Aquaculture Society 309-313 (2007).
Tajik et al., Preparation of Chitosan from Brine Shrimp (*Artemia urminana*) Cyst Shells and Effects of Different Chemical Processing Sequences on the Physicochemical and Functional Properties of the Product, 13 Molecules 1263-1274 (2008).
Ward, Papers from the symposium on Extraction Processes presented at the 73$^{rd}$ AOCS Annual Meeting held in Toronto, Canada M 2-6, 1982, 61(8) JAOCSW 1358-1359 (Aug. 1984).
Edible insects—Future prospects for food and feed security, Food and Agriculture Organization of the United Nations, FAO Forestry paper 171 (2013).
Bosch et al., Protein quality of insects as potential ingredients for dog and cat foods, 3(e29) Journal of Nutritional Science 1-4 (2014).
Einarsson et al., 2(1) Journal for the Utilization of Agricultural Products 37-40 (1955).
Finke, Estimate of Chitin in Raw Whole Insects, 26 Zoo Biology 105-115 (2007).
Ikeda et al., Manufacturing Process and Business Feasibility of Red Sea Bream Diet from Food Waste, 15(4) Journal of the Japan Society of Waste Management Experts 246-255 (2004).
Makkar et al., State-of-the-art on use of insects as animal feed, 197 Animal Feed Science and Technology 1-33 (2014).
Yi et al., Extraction and characterisation of protein fractions from five insect species, 141 Food Chemistry 3341-3348 (2013).
Shen, Study on Nutrition Value Assessment and Exploitation of Utilization of Tenebrio molitor L., 6 China Doctoral Master's Theses Full-Text Database (Master) Agricultural Science and Technology D-051-10 (2005) (English Abstract).
Yulong, Emergence of . . . insects, Scientific Breeding 16 (Jul. 31, 2008).
Marono et al., In Vitro crude protein digestibility of *Tenebrio molitor* and *Hermetia illucens* insect meals and its correlation with chemical composition traits, 14(3889) Italian Journal of Animal Science (2015).
Rothman et al., Nutritional contributions of insects to primate diets: Implications for primate evolution, 71 Journal of Human Evolution 59-69 (2014).

* cited by examiner

BEETLE POWDER

CROSS-REFERENCE TO RELATED APPLICATIONS

This application is a U.S. National Stage Application pursuant to 35 U.S.C. § 371 of International Patent Application PCT/FR2015/053785, filed on Dec. 30, 2015, and published as WO 2016/108037 on Jul. 7, 2016, which claims priority to French Patent Application 1463512, filed on Dec. 31, 2014, and French Patent Application No. 1560012, filed on Oct. 20, 2015, all of which are incorporated herein by reference in their entireties for all purposes.

The present invention relates to an insect powder. It also relates to a method for the preparation of this powder and use thereof in human or animal nutrition, and more particularly in fish feed.

Aquaculture is now one of the most dynamic sectors in the food industry. The high demand for fish has resulted in a significant increase in the price of feed intended for farming fish.

One of the most used products in fish feed is fishmeal. Fishmeal is one of the main sources of proteins in aquaculture feeds. It is a meal that is very rich in animal proteins (rich in amino acids of the lysine and methionine types) that are easy to digest. A growing demand accompanied by a limited supply has resulted in a significant increase in its price, creating a risk to the sustainable growth of aquaculture. Thus, there is a high demand for alternative sources of high-quality and, so far as possible, renewable proteins for aquaculture feeds.

Insect meals offer natural replacement protein sources and the possibility of being mass-produced with a minimal ecological footprint. In particular, certain beetles such as *Tenebrio molitor*, have the benefit of being suitable for intensive mass production.

However, the results of tests substituting various insect meals for fishmeal prove to be mixed. In the case where substitution proves possible, it generally does not exceed 50%; effects detrimental to the growth of the fish being observed beyond this content.

The inventors' work has made it possible to demonstrate that a specific insect powder could be advantageously used to replace a fishmeal in aquaculture feed.

The present invention therefore relates to a beetle (Coleoptera) powder comprising at least 67% by weight proteins and at least 5% by weight chitin, the percentages by weight being given relative to the total weight of beetle powder.

It will be noted that in the context of the present application, and unless otherwise stipulated, the ranges of values indicated are understood to be inclusive.

By "beetle powder", is meant a composition, in the form of particles, prepared solely from beetles and optionally water.

The residual moisture content of the beetle powder is comprised between 2 and 15%, preferably between 5 and 10%, more preferably between 4 and 8%. This moisture content can for example be determined according to the method originating from EC Regulation 152/2009 of 27 Jan. 2009 (103° C./4 h).

Throughout the application, when no date is specified for a regulation, a standard or a directive, it refers to the regulation, standard or directive in force on the filing date.

When the beetle powder is ground to a particle size acceptable for human or animal nutrition, the latter can be referred to as "Coleoptera meal". By "particle size acceptable for human or animal nutrition", is meant a particle size comprised between 100 µm and 1.5 mm, preferably comprised between 300 µm and 1 mm, more preferably between 500 and 800 µm.

Preferably, the beetles preferred according to the invention belong to the families of the Tenebrionidae, Melolonthidae, Dermestidae, Coccinellidae, Cerambycidae, Carabidae, Buprestidae, Cetoniidae, Dryophthoridae, or mixtures thereof.

More preferably, they are the following beetles: *Tenebrio molitor, Aiphitobius diaperinus, Zophobas morio, Tenebrio obscurus, Tribolium castaneum* and *Rhynchophorus ferrugineus*, or mixtures thereof.

By "proteins", is meant the quantity of crude proteins. The quantification of crude proteins is well known to a person skilled in the art. By way of example, the Dumas method or the Kjeldahl method may be mentioned. Preferably, the Dumas method, corresponding to the standard NF EN ISO 16634-1 (2008), is used.

Preferably, the beetle powder comprises 68% by weight crude proteins, more preferably 70% by weight crude proteins, the percentages by weight being given relative to the total weight of beetle powder.

According to the invention, by "chitin", is meant any type of chitin derivative, i.e. any type of polysaccharide derivative comprising N-acetyl-glucosamine units and D-glucosamine units, in particular the chitin-polypeptide copolymers (sometimes referred to as "chitin-polypeptide composite"). These copolymers can also be combined with pigments, often of the melanin type.

Chitin would be the second most synthesized polymer in the living world after cellulose. In fact, chitin is synthesized by numerous species of the living world: it constitutes part of the exoskeleton of crustaceans and insects and the lateral wall which surrounds and protects fungi. More particularly, in insects, chitin thus constitutes 3 to 60% of their exoskeleton.

The chitin content is determined by extraction thereof. Such a method can be the method AOAC 991.43 described in Example 2, and is a preferred method for this determination.

Preferably, the powder comprises between 5 and 16% by weight chitin, more preferably between 8 and 14% chitin, the percentages by weight being given relative to the total weight of beetle powder.

The beetle powder according to the invention comprises a high content of crude proteins. Such a content is usually obtained only by a beetle-treatment method comprising a hydrolysis step. A hydrolysis step has the effect of reducing the chitin content to a level of the order of 5% by weight, such as less than 5% by weight, relative to the total weight of the composition.

Now, chitin is often considered as a kind of anti-nutritional factor because it is difficult to digest. This explains why for applications in the agri-food sector, insect-based compositions are dechitinized, i.e. a step of removing the chitin is carried out. The inventors' work also made it possible to demonstrate that, contrary to received ideas, chitin had no impact on the growth of fish fed with a beetle powder according to the invention comprising a significant chitin content (see Example 4 below). On the contrary, the beetle powder according to the invention can advantageously replace not just part but all of a fishmeal in an aquaculture feed. In fact, the beetle powder according to the invention makes it possible to improve the growth of animals fed with this powder.

Moreover, during the feed-manufacturing process, the introduction of the beetle powder according to the invention also has certain advantages: reducing losses of water-soluble vitamins during optional heat treatments and reducing the energy required during an optional extrusion step.

Advantageously, the beetle powder according to the invention has an ash content less than or equal to 4% by weight relative to the total weight of beetle powder, and even more advantageously less than or equal to 3.5%.

Ash constitutes the residue resulting from the combustion of the composition according to the invention.

The method for determining the ash content is well known to a person skilled in the art. Preferably, the ash content was determined according to the method laid down by EC regulation 152/2009 of 27 Jan. 2009.

The fat content of the beetle powder according to the invention is preferably comprised between 5 and 20% by weight relative to the total weight of beetle powder, more preferably between 9 and 17%.

The methods for determining the fat content are well known to a person skilled in the art. By way of example and in preferred manner, this content will be determined according to the method of EC regulation 152/2009.

Advantageously, the proteins of the beetle powder according to invention have a digestibility greater than or equal to 85% by weight relative to the total weight of crude proteins.

The digestibility is a pepsin digestibility measured by the method described in Directive 72/199/EC.

Preferably, the digestibility is greater than or equal to 86%, more preferably greater than or equal to 88%.

Advantageously, the beetle powder according to the invention comprises between 35 and 65% by weight soluble proteins relative to the total weight of proteins, and at least 50% of the soluble proteins have a size less than or equal to 12,400 g/mol.

By "total weight of proteins", is meant the weight of crude proteins present in the beetle powder according to the invention.

By "soluble proteins", is meant, among the crude proteins, those which are soluble in an aqueous solution the pH of which is comprised between 6 and 8, advantageously between 7.2 and 7.6.

Preferably, the aqueous solution is a buffer solution the pH of which is comprised between 6 and 8, advantageously between 7.2 and 7.6. Preferably, the buffer solution is an NaCl phosphate buffer solution, the pH of which is equal to 7.4+/−0.2.

The digestibility of proteins in humans and animals is very much determined by the size of the proteins. In animal nutrition, it is common to reduce the size of the proteins in order to facilitate digestion by the animals. This reduction in the size of the proteins is generally carried out by hydrolysis processes (for example enzymatic), the implementation of which is particularly costly.

The beetle powder according to the invention, obtained by a method not involving hydrolysis, comprises a large quantity of soluble proteins the size of which is sufficiently reduced to facilitate digestion by the animals. The beetle powder according to the invention also has the advantage of being able to be prepared at a lower cost.

Advantageously, the beetle powder according to the invention comprises between 38 and 60% by weight, preferably between 43 and 55% by weight soluble proteins relative to the total weight of proteins.

Preferably, at least 60%, preferably at least 70% of the soluble proteins have a size less than or equal to 12,400 g/mol.

More particularly, the soluble proteins have a size comprised between 6,500 and 12,400 g/mol.

Advantageously, less than 10%, preferably less than 8%, more preferably less than 6% of soluble proteins have a size greater than or equal to 29,000 g/mol.

By way of example, steric exclusion chromatography analysis of the size of the soluble proteins of a beetle powder according to the invention is presented in Example 6.

The invention also discloses a method for the preparation of a beetle powder according to the invention.

The method for the preparation of the beetle powder according to the invention comprises a step of pressing the beetles.

The objective of pressing is to de-oil the beetles and thus to obtain a press cake having an oil (or fat) content less than or equal to 20% by weight relative to the dry weight of press cake, preferably less than or equal to 17%.

The pressing step is described more fully in step 2 of the preparation method detailed hereafter.

In particular, it is possible to carry out hot or cold pressing. Preferably, a single-screw press is used.

More particularly, the preparation method according to the invention comprises the following steps:
i) killing the beetles,
ii) pressing the beetles in order to obtain a press cake, and
iii) grinding the press cake.

The beetles can be killed by scalding or blanching, as described more fully hereafter in step 1 of the detailed method.

Similarly, the grinding is described more fully in the step 4 of the detailed method.

Finally, the preparation method according to the invention can also comprise a step of drying the press cake.

The drying step is advantageously carried out after the pressing step and before the grinding step.

The drying is described more fully in step 3 of the method detailed.

Detailed Method for the Preparation of the Beetle Powder According to the Invention Step 1: Killing the Insects This killing step 1 can advantageously be carried out by scalding or by blanching. This step 1 makes it possible to kill the insects while reducing the microbial load (reducing the risk of deterioration and health risk) and by inactivating the internal enzymes of the insects which can trigger autolysis, and thus a rapid browning thereof.

For the scalding, the insects, preferably larvae, are thus scalded with water for 2 to 20 min, preferably 5 to 15 min. Preferably, the water is at a temperature comprised between 95 to 100° C., preferably 100° C.

The quantity of water introduced during the scalding is determined as follows: the ratio of the volume of water in mL to the weight in g of insect is preferably comprised between 0.3 and 10, more preferably between 0.5 and 5, even more preferably between 0.7 and 3, even more preferably of the order of 1.

For the blanching, the insects, preferably larvae, are blanched with steam (steam nozzles or bed) at a temperature comprised between 80 and 130° C., preferably between 90 and 120° C., more preferably between 95 and 105° C., even more preferably 98° C. or with water at a temperature comprised between 95 and 100° C., preferably 100° C. (by spray nozzles) or in mixed mode (water+steam) at a temperature comprised between 80 and 130° C., preferably between 90 and 120° C., more preferably between 95 and 105° C., even more preferably 98° C. The residence time in the blanching chamber is comprised between 1 and 15 minutes, preferably between 3 and 7 min.

(Optional) Step: Grinding

The insects are removed from the scalding tank or blanching chamber, they are then sieved (or drained), and placed in a grinder, such as a knife mill, making it possible to reduce the insects to particles.

In order to facilitate the grinding, a quantity of water can be added. This quantity of water is similar to that introduced during the scalding step 1: the ratio of the volume of water in mL to the weight in g of insect is preferably comprised between 0.3 and 10, more preferably between 0.5 and 5, even more preferably between 0.7 and 3, even more preferably of the order of 1. It is also possible to keep the scalding water and/or the water resulting from the blanching in order to carry out this step.

Preferably, on completion of the grinding, the size of the insect particles is less than 1 cm (largest particle size observable using a microscope), preferably less than 0.5 cm. Preferably, the size of the particles is comprised between 300 μm and 3 mm, more preferably between 500 μm and 1 mm. It is not necessary to excessively reduce the size of the particles, for example to a size less than 250 μm.

Step 2: Pressing

The insects originating from the killing step 1, or the wet paste originating from the optional grinding step is then placed in a press according to a procedure which makes it possible to press and separate a juice comprising both a fat fraction and a protein fraction.

Preferably, the pressing step makes it possible to obtain a press cake comprising an oil content less than or equal to 20% by weight relative to the dry weight of the press cake, preferably, less than or equal to 17%, more preferably less than or equal to 15%.

Similarly, the pressing step makes it possible to obtain a press cake having a dry matter content comprised between 30% and 60%, preferably comprised between 40% and 55%, and more preferably comprised between 45% and 55%.

Any press system can be used for carrying out the pressing step, such as for example a single-screw or twin-screw press (twin-screw press of the Angel type), a filter press (filter press of the Choquenet type), a platen press, etc. These systems are well known to a person skilled in the art who is able to determine the pressing conditions in order to obtain the oil and/or water contents mentioned above.

In particular, it is possible to carry out hot or cold pressing. Advantageously, the pressing will be carried out hot, which makes it possible to increase the de-oiling of the press cake. In particular, hot pressing makes it possible to obtain a press cake comprising an oil content less than or equal to 17% by weight relative to the dry weight of press cake, preferably less than or equal to 15%.

Step 3: Drying

The press cake is then dried by the standard technologies known to a person skilled in the art. The drying can be direct or indirect (thin layer dryer, "paddle dryer", "tubular dryer", "disc-dryer", etc.) at a temperature comprised between 60° C. and 260° C., for a duration of 15 min to 24 hours. By way of example, the press cake can be arranged and dried in ventilated/stirred air at a temperature comprised between 80 and 100° C., preferably at 90° C. for a duration comprised between 3 and 7 hours, preferably 5 hours.

The objective of this drying step is to obtain a press cake having a moisture content comprised between 2 and 15%, preferably between 5 and 10%, even more preferably between 4 and 8%.

Step 4: Final Grinding

The dried press cake is then placed in a grinder, such as a hammer mill, making it possible to reduce the press cake to particles.

Advantageously, on completion of this final grinding, the size of the insect particles is less than 0.5 cm (largest particle size observable using a microscope), preferably of the order of 1 mm. More particularly, the particle size is comprised between 300 μm and 1 mm, even more preferably between 500 and 800 μm.

The succession of these four steps makes it possible to obtain a beetle powder according to the invention, comprising a high content of crude proteins while maintaining a chitin content of the order of at least 5% by weight relative to the total weight of the composition.

As indicated above, the pressing step can be carried out cold or hot.

By way of example of a method for obtaining the beetle powder according to the invention, involving cold pressing:

Larvae, for example of *T. molitor*, are introduced into a beaker containing 200 mL of water brought to the boil beforehand, and killed by scalding in a water bath at 100° C. After 5 minutes, the beaker is removed from the water bath, the larvae are drained, then mixed with a volume of water of 200 mL. The liquid thus obtained is passed into a twin-screw-type press. The press cake thus obtained is dried for 24 hours in an oven at 70° C., then ground to 250 μm.

By way of example of a method for obtaining the beetle powder according to the invention, involving hot pressing:

Larvae, for example of *T. molitor*, are introduced into a blanching chamber and blanched in steam for 5 min at 100° C. The larvae thus blanched are then introduced into a "drying"-type press suitable for water-laden products. The press cake thus obtained is dried for 5 hours in an oven at 90° C., then ground in a hammer mill to 1 mm.

Preferably, the method for the preparation of a beetle powder according to the invention comprises the following steps:
  i) killing the beetles,
  ii) pressing the beetles in order to obtain a press cake,
  iii) drying the press cake, and
  iv) grinding the press cake.

According to a first embodiment of the method according to the invention, the pressing step is preceded by a step of grinding the beetles.

The invention thus relates to a method for the preparation of a beetle powder according to the invention comprising the following steps:
  i) killing the beetles,
  ii) pressing the beetles in order to obtain a press cake,
  iii) drying the press cake, and
  iv) grinding the press cake,
in which the pressing step is preceded by a step of grinding the beetles.

An advantage of the step of grinding the beetles prior to the pressing is described more fully in Example 5.

According to a second embodiment of the method according to the invention, the step of pressing the beetles is carried out hot.

The invention thus relates to a method for the preparation of a beetle powder according to the invention comprising the following steps:
  i) killing the beetles,
  ii) pressing the beetles in order to obtain a press cake,
  iii) drying the press cake, and
  iv) grinding the press cake,
in which the pressing step is carried out hot.

As indicated above, hot pressing makes it possible to obtain a press cake comprising an oil content less than or equal to 17% by weight relative to the dry weight of press cake, preferably less than or equal to 15%.

According to a third embodiment of the method according to the invention, the step of grinding the press cake is carried out to a particle size comprised between 300 μm and 1 mm, preferably between 500 and 800 μm.

The invention thus relates to a method for the preparation of a beetle powder according to the invention comprising the following steps:
  i) killing the beetles,
  ii) pressing the beetles in order to obtain a press cake,
  iii) drying the press cake, and
  iv) grinding the press cake,
in which the step of grinding the press cake is carried out to a particle size comprised between 300 μm and 1 mm.

More particularly, in this third embodiment of the method according to the invention, the step of pressing the beetles can be carried out hot. Alternatively, the pressing step can be preceded by a step of grinding the beetles.

The invention finally relates to the use of the beetle powder according to the invention in human or animal nutrition.

Advantageously, the beetle powder according to the invention can be used in feed for pets such as dogs, cats, birds, fish, reptiles and rodents.

More particularly, the beetle powder according to the invention can be used in aquaculture (fish, crustaceans), feed for poultry (chickens), pigs, ruminants (cattle, sheep, goats, horses) and mink.

Finally, the beetle powder according to the invention can be advantageously used to replace protein flour.

By protein flour is meant more particularly a fishmeal, milk powder or lactoserum powder, concentrated soy protein ("CSP"), meat meal, such as for example poultry meal.

The replacement can be partial or total.

Preferably, the beetle powder according to the invention is used for partial or total replacement of a fishmeal, such as a 50 or 100% replacement.

Figure 2A:
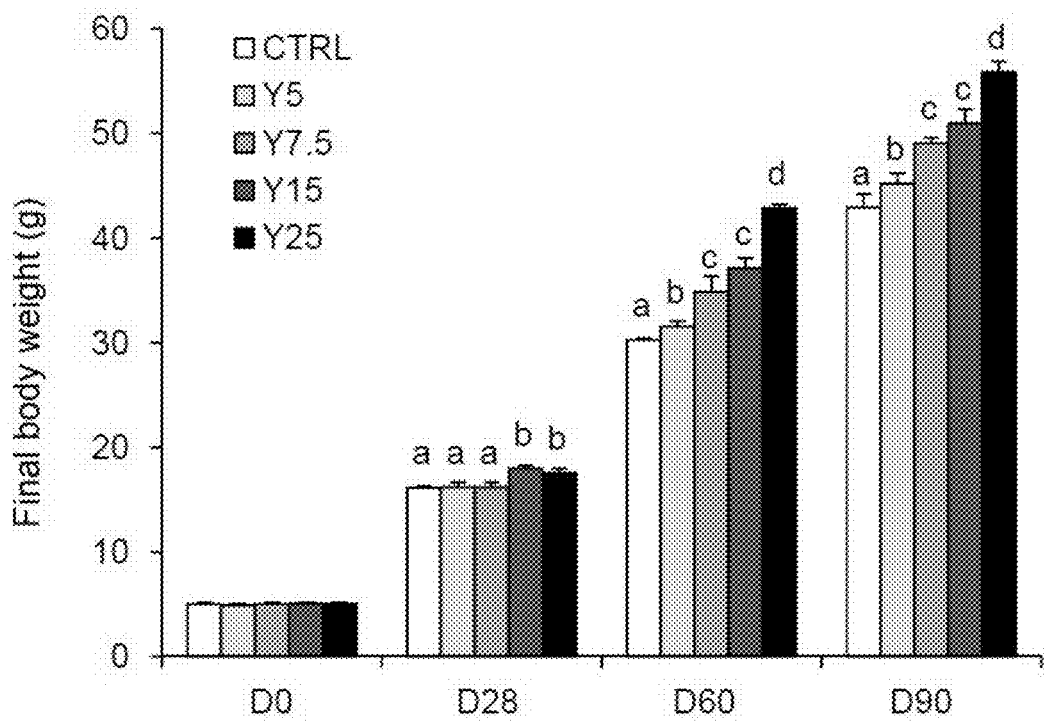
Figure 2B:
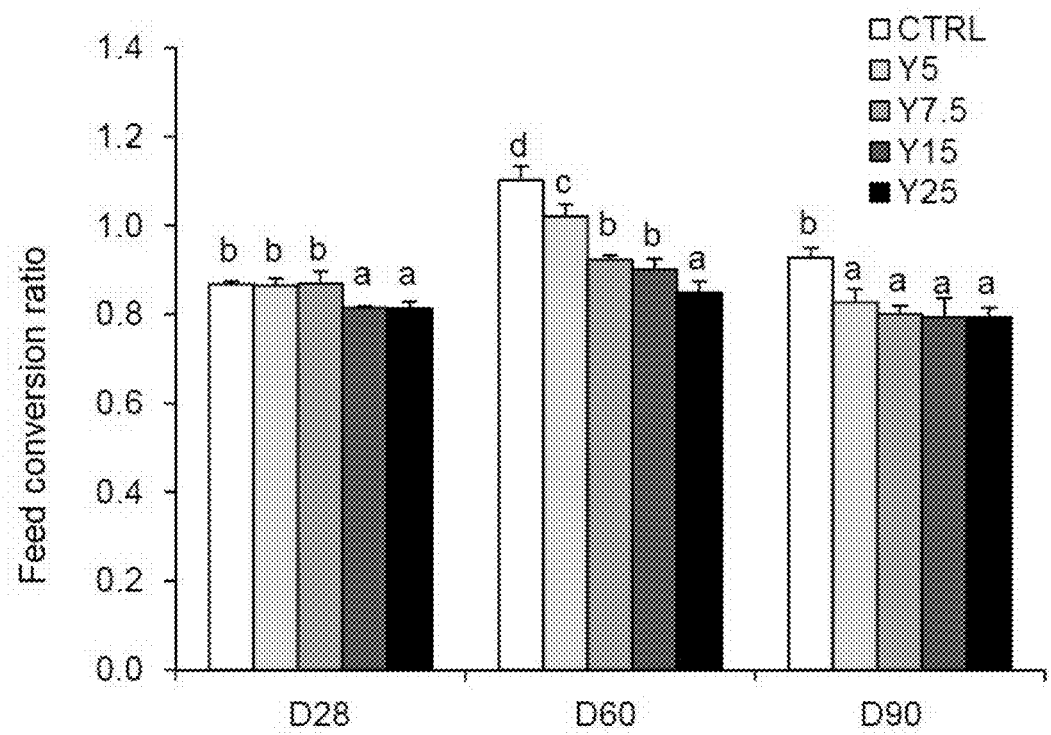
Figure 3:
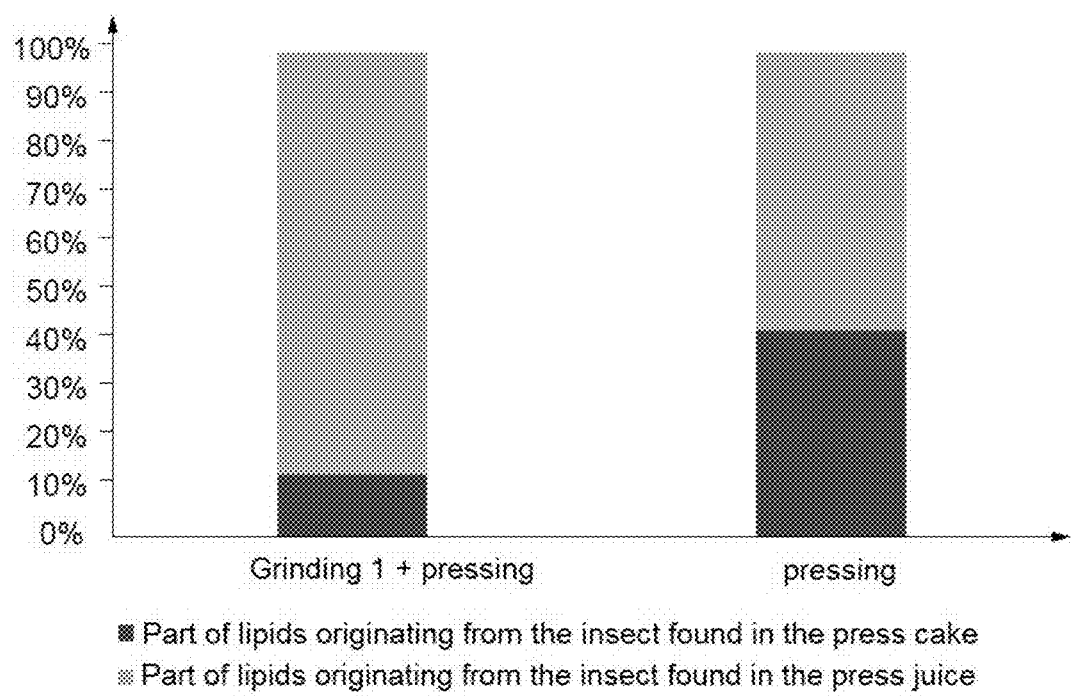
Figure 4:
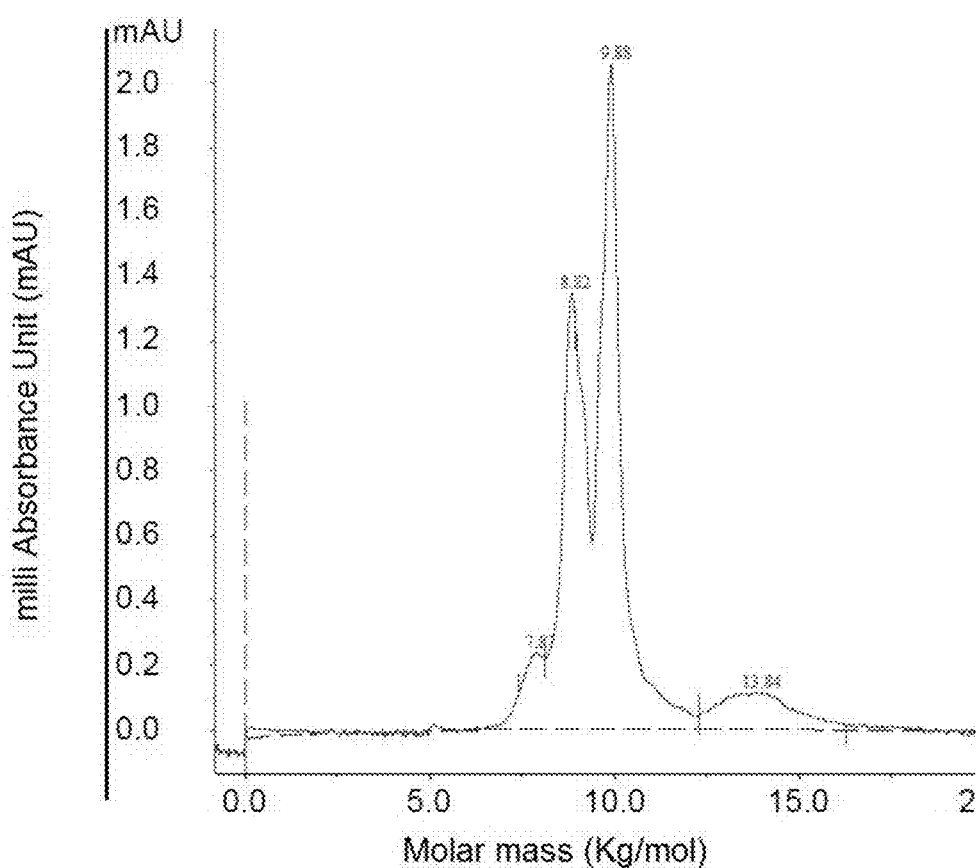

Other features and advantages of the invention will become apparent from the following examples, given by way of illustration, with reference to:

FIG. 1, which is a diagram illustrating the variations in temperatures of the water and in the levels of oxygen dissolved in the tanks where trout fed with different doses of beetle powder according to the invention were farmed, FIG. 2, which comprises two diagrams illustrating the impact on final body weight (FIG. 2A) and the feed conversion ratio (FIG. 2B) of trout fed with different doses of beetle powder according to the invention, FIG. 3, which illustrates the distribution of the lipids originating from the insect found in the juice and the press cake obtained by a method comprising a pressing step or a grinding step then pressing, FIG. 4, which is a diagram representing the steric exclusion chromatography analysis of the size of the proteins of the beetle powder according to the invention.

Example 1: Method for the Preparation of a Beetle Powder According to the Invention The beetles used for preparing the beetle powder are *Tenebrio molitor* larvae. Upon receipt of the larvae, they can be stored at 4° C. for 0 to 15 days in their rearing tanks without major degradation before being killed. The weight (age) of the larvae used is variable and as a result their composition can vary, as illustrated in Table 1 below:

TABLE 1

Biochemical composition of *Tenebrio molitor* larvae according to their weight.

| Biomass (insects) | mg | 23 | 35 | 58 | 80 | 108 | 154 |
|---|---|---|---|---|---|---|---|
| Dry matter | %* | 34 | 34 | 34.2 | 37.9 | 39.6 | 39.5 |
| Ash | %* | 1.59 | 1.52 | 1.6 | 1.75 | 1.67 | 1.43 |
| Crude proteins | %* | 22.6 | 22.2 | 22 | 23.2 | 23.1 | 23.2 |
| Lipids | %* | 6.62 | 6.88 | 7.98 | 10.3 | 10.9 | 11.7 |

*The % are expressed as dry weight relative to the wet weight of larvae.

Step 1: Blanching of the Insects

Living larvae (+4° C. to +25° C.) are conveyed in layers with a thickness comprised between 2 and 10 cm, on a perforated conveyor belt (1 mm) to a blanching chamber. The insects are thus blanched in steam (steam nozzles or bed) at 98° C. or in water at 100° C. (spray nozzles) or in mixed mode (water+steam). The residence time in the blanching chamber is comprised between 1 to 15 minutes, ideally 5 min.

The temperature of the larvae after blanching is comprised between 75° C. and 98° C.

Step 2: Pressing

The larvae, once blanched, are conveyed to the feed hopper of a continuous single-screw press. While passing into the press, the larvae are maintained at a temperature above 70° C. in order to increase the de-oiling yields. The principle of de-oiling is to pressurize the material inside a cylindrical cage by means of an arrangement of screws and rings arranged on the central shaft. The cage is lined inside with bars distributed in sections and kept apart by spaces of different thicknesses depending on the work area. The interstices thus arranged allow the flow of an oil/fat fraction while limiting the passage of the so-called "dry" matter, the protein fraction, which is called "press cake", thus being involved in the pressurization.

The pressing yields obtained are comprised between 48 and 55%.

$$Y_{cake} = (\text{mass}_{cake}/\text{mass}_{juice} + \text{mass}_{cake})$$

The press cake obtained contains 35 to 40% dry matter, 67 to 75% proteins and 13 to 17% fats, the percentages by weight being given relative to the dry weight of press cake.

Step 3: Drying

The press cake is then arranged on a tray in a thin layer (approximately 2 cm) and is dried in ventilated/stirred air at 90° C. for 5 hours in order to obtain a press cake having a dry matter content greater than 92%.

This step makes it possible to guard against any contamination having occurred since the killing.

The Aw (water activity) after drying is 0.35. The microbiological results show an absence of *Salmonella* spp (method: IRIS *Salmonella* BKR 23/07-10/11) and Enterobacteria values less than 10 CFU/g (method: NF ISO 2128-2, December 2004, 30° C. and 37° C.).

Step 4: Grinding

The dried press cake, comprising mainly proteins, is finally ground using a continuous hammer mill (6 reversible moving parts—thickness 8 mm). The grinder is fed by a hopper with a flow rate control flap (180 kg/h). The perforated grill used to control the output granulometry is 0.8 mm. The speed of rotation of the motor is 3000 rpm (electric motorization, absorbed power 4 kW (5.5 CV)).

Example 2: Characterization of the Beetle Powder According to the Invention

The beetle powder prepared in Example 1 was characterized.

1. Analyses 1.1 Determination of the Moisture Content

The moisture content is determined according to the method originating from EC Regulation 152/2009 of 27 Jan. 2009 (103° C./4 h).

1.2 Determination of the Quantity of Crude Proteins

The crude proteins are determined according to the method called Dumas, and corresponding to the standard NF EN ISO 16634-1 (2008).

1.3 Determination of the Quantity of Chitin

The dietary fibres in the insect meal are essentially composed of chitin, the latter was therefore assayed according to the method AOAC 991.43. The values thus obtained are slightly overestimated as a result.

1.4 Determination of the Quantity of Fat

The fat was determined according to the method of EC Regulation 152/2009.

1.5 Determination of the Quantity of Ash

The crude ash was determined according to the method under EC Regulation 152/2009 of 27 Jan. 2009.

1.6 Determination of the Quantity of Phosphorus

The phosphorus is assayed by ICP ("induced coupled plasma") with internal calibration.

1.7 Determination of Energy

The energy value is obtained with the coefficients of EU Regulation 1169/2011.

1.8 Determination of the Quantities of Amino Acids and Fatty Acids

This determination was carried out by gas chromatography after hydrolysis and derivatization of the amino acids and fatty acids respectively.

1.9 Determination of Pepsin Digestibility

The pepsin digestibility is measured by the method described in Directive 72/199/EC.

2. Results

The composition of this beetle powder is presented in Table 2 below.

TABLE 2

Composition of the beetle powder.

| | Unit | Powder |
|---|---|---|
| Macronutrient | | |
| Moisture | %* | 5.32 |
| Protein | %* | 67.09 |
| Chitin | %* | 8.0 |
| Fat | %* | 13.6 |
| Ash | %* | 3.21 |
| Total phosphorus | %* | 0.75 |
| Energy | MJ/kg | 23.74 |
| Amino acids | | |
| Arginine | %* | 2.56 |
| Histidine | %* | 1.39 |
| Isoleucine | %* | 2.11 |
| Leucine | %* | 3.99 |
| Lysine | %* | 3.32 |
| Threonine | %* | 1.87 |
| Valine | %* | 2.91 |
| Methionine | %* | 1.43 |
| Cysteine | %* | 0.63 |
| Phenylalanine | %* | 1.98 |
| Tyrosine | %* | 2.68 |

TABLE 2-continued

Composition of the beetle powder.

| | Unit | Powder |
|---|---|---|
| Taurine | %* | 0.42 |
| Aspartic acid + asparagine | %* | 4.51 |
| Glutamic acid + glutamine | %* | 6.36 |
| Alanine | %* | 3.83 |
| Glycine | %* | 2.54 |
| Proline | %* | 3.18 |
| Serine | %* | 2.94 |
| Fatty acids | | |
| C12:0 | %* | 0.03 |
| C14:0 | %* | 0.22 |
| C15:0 | %* | 0.01 |
| C16:0 | %* | 1.33 |
| C16:1 | %* | 0.05 |
| C16:1n-7 | %* | 0.16 |
| C17:0 | %* | 0.02 |
| C17:1 | %* | 0.01 |
| C18:0 | %* | 0.35 |
| C18:1n-9 | %* | 3.03 |
| C18:1n-7 | %* | 0.04 |
| C18:2n-6 | %* | 2.96 |
| C18:2tn-6 | %* | 0.02 |
| C18:3n-3 | %* | 0.14 |
| C20:0 | %* | 0.02 |
| C20:1n-9 | %* | 0.01 |
| C20:2n-6 | %* | 0.01 |
| C22:0 | %* | 0.01 |

*The percentages by weight are expressed relative to the total weight of powder.

Moreover, a pepsin digestibility of 90+/−2% is obtained.

Example 3: Alternative Method for the Preparation of a Beetle Powder According to the Invention 200 g of *T. molitor* larvae are introduced into a beaker, placed in a water bath at 100° C. and containing 200 mL of water brought to the boil beforehand. After 5 minutes, the beaker is removed from the water bath, the larvae are drained, then mixed with a volume of water of 200 mL. The liquid thus obtained is passed into a press of the twin-screw type. The press cake thus obtained is dried for 24 hours in an oven at 70° C., then ground to 250 μm. A beetle powder is thus obtained.

Example 4: Introduction of the Beetle Powder According to the Invention Into Fish Feed In the present example, the effect of including a beetle powder in feed on growth, feed intake, feed conversion, body composition and the apparent digestibility of the nutrients in the rainbow trout was studied.

1. Material and Methods 1.1. Beetle Powder

The beetle powder utilized in this example is that obtained according to Example 1 and described more fully in Example 2.

1.2. Experimental Diets

A fishmeal-based diet (CTRL) was formulated with convenient ingredients in order to meet the known nutritional needs of juvenile rainbow trout. This CTRL diet is composed 25% of fishmeal, 8% of other protein sources of marine origin (squid meal and krill meal), while the remaining protein sources were a concentrate of soy protein, wheat gluten and maize gluten. On the basis of this formulation, four test diets (Y5, Y7.5, Y15 and Y25) were formulated, in which the fishmeal was replaced with beetle powder in respective contents of 20, 30, 60 and 100% (see Table 3 below).

TABLE 3

Formulation and composition of the experimental diets.

| Ingredients in %*: | CTRL | Y5 | Y7.5 | Y15 | Y25 |
|---|---|---|---|---|---|
| Fishmeal LT70[1] | 25.00 | 20.00 | 17.50 | 10.00 | 0.00 |
| Krill meal[2] | 3.00 | 3.00 | 3.00 | 3.00 | 3.00 |
| Squid meal[3] | 5.00 | 5.00 | 5.00 | 5.00 | 5.00 |
| Beetle powder |  | 5.00 | 750 | 15.00 | 25.00 |
| Concentrate of soy proteins[4] | 14.00 | 14.00 | 14.00 | 14.00 | 14.00 |
| Wheat gluten[5] | 9.05 | 9.25 | 9.40 | 9.65 | 10.10 |
| Maize gluten[6] | 8.20 | 8.20 | 8.20 | 8.20 | 8.20 |
| Soy meal 48 | 7.50 | 7.50 | 7.50 | 7.50 | 7.50 |
| Whole peas | 6.15 | 5.75 | 5.40 | 4.75 | 3.70 |
| Fish oil | 11.50 | 11.50 | 11.50 | 11.50 | 11.50 |
| Rapeseed oil | 6.00 | 5.80 | 5.70 | 5.40 | 5.00 |
| Pre-mixture of vitamins and minerals[7] | 1.50 | 1.50 | 1.50 | 1.50 | 1.50 |
| Soy lecithin | 1.00 | 1.00 | 1.00 | 1.00 | 1.00 |
| Guar gum | 0.20 | 0.20 | 0.20 | 0.20 | 0.20 |
| Antioxidant | 0.20 | 0.20 | 0.20 | 0.20 | 0.20 |
| Sodium propionate | 0.10 | 0.10 | 0.10 | 0.10 | 0.10 |
| Monocalcium phosphate | 1.30 | 1.70 | 2.00 | 2.60 | 3.50 |
| DL-methionine | 0.30 | 0.30 | 0.30 | 0.40 | 0.50 |
| Yttrium oxide[8] | 0.02 | 0.02 | 0.02 | 0.02 | 0.02 |
| Dry matter (DM), %* | 93.4 ± 0.0 | 93.1 ± 0.0 | 93, ± 0.1 | 95.0 ± 0.0 | 93.2 ± 0.0 |
| Crude protein, % DM** | 48.5 ± 0.0 | 48.5 ± 0.1 | 48.5 ± 0.0 | 48.5 ± 0.0 | 48.5 ± 0.1 |
| Crude fats, % DM** | 22.7 ± 0.2 | 22.7 ± 0.1 | 22.6 ± 0.2 | 22.7 ± 0.2 | 22.7 ± 0.2 |
| Ash, % DM** | 9.4 ± 0.0 | 8.8 ± 0.0 | 8.7 ± 0.1 | 8.1 ± 0.0 | 7.4 ± 0.0 |
| Chitin, % DM** | 0.06 | 0.46 | 0.66 | 1.26 | 2.06 |
| Gross energy, MJ/kg of DM | 23.2 ± 0.2 | 23.2 ± 0.0 | 23.2 ± 0.0 | 23.2 ± 0.1 | 23.2 ± 0.1 |

*% of dry matter relative to the total weight of the composition
**% by dry weight relative to the total weight of the dry matter
[1]Peruvian fishmeal LT70: 71% crude proteins (CP), 11% crude fats (CF), EXALMAR, Peru;
[2]Krill meal: 61% CP, 19% CF, Aker BioMarine Antarctic AS, Norway;
[3]Super Prime without viscera: 82% CP, 3.5% CF, Sopropêche, France;
[4]Soycomil P: 62% CP, 0.7% CF, ADM, Netherlands;
[5]Viten: 84.7% CP, 1.3% CF, ROQUETTE, France;
[6]Maize gluten meal: 61% CP, 6% CF, COPAM, Portugal;
[7]PREMIX Lda, Portugal.
Vitamins (IU or mg/kg diet):
DL-alpha tocopheral acetate, 100 mg; Menadione sodium biosulfite, 25 mg; Retinyl acetate, 20,000 IU; DL-cholecalciferol, 2000 IU; thiamine, 30 mg; riboflavin, 30 mg; pyridoxine, 20 mg; cyanocobalamine, 0.1 mg; nicotinic acid, 200 mg; folic acid, 15 mg; ascorbic acid, 100 mg; inositol, 500 mg; biotin, 3 mg; calcium pantothenate, 100 mg; choline chloride, 1000 mg; betaine, 500 mg.
Minerals (g or mg/kg):
cobalt carbonate, 0.65 mg; copper sulphate, 9 mg; ferric sulphate, 6 mg; potassium iodide, 0.5 mg; manganese oxide, 9.6 mg; sodium selenite, 0.01 mg; zinc sulphate, 7.5 mg; sodium chloride, 400 mg; calcium carbonate, 1.86 g; excipient wheat;
[8]the yttrium oxide was incorporated in only a fraction of the feed used for the digestibility measurement.

The levels of squid and krill meal were kept constant among all the diets in order to guarantee a high palatability. Minor adjustments were made to the formulation of the diets tested in order to maintain the isonitrogenous conditions (crude protein, 48.5% DM), isolipidic conditions (22.7% DM) and isoenergetic conditions (crude energy, 23.2 MJ/kg DM). The levels of supplementation with methionine and monocalcium phosphate in the diets tested were adjusted in order to correspond to those found in the CTRL feed.

The diets were produced by extrusion (granule sizes: 1.2 and 2.0 mm) using a CLEXTRAL BC45 twin-screw extruder on a pilot scale with a screw diameter of 55.5 mm and a temperature range of 119 to 123° C. During the extrusion, all the batches of extruded feeds were dried in a vibrating fluidized bed dryer (model DR100, TGC Extrusion, France). After cooling the granules, the oils were added by coating under vacuum (model PG-10VCLAB, Dinnisen, Netherlands). Throughout the duration of the test, the experimental feeds were stored at ambient temperature, but in a cool, well-ventilated place. Samples representative of each diet were taken for analysis (Tables 4-5).

TABLE 4

Amino acid profile of the experimental diets.

| Amino acids | CTRL | Y5 | Y7.5 | Y15 | Y25 |
|---|---|---|---|---|---|
| Arginine | 4.62 ± 0.23 | 4.53 ± 0.02 | 4.49 ± 0.23 | 4.27 ± 0.09 | 3.89 ± 0.09 |
| Histidine | 1.47 ± 0.11 | 1.56 ± 0.02 | 1.54 ± 0.09 | 1.46 ± 0.07 | 1.50 ± 0.08 |
| Isoleucine | 2.31 ± 0.01 | 2.52 ± 0.01 | 2.53 ± 0.01 | 2.46 ± 0.02 | 2.49 ± 0.00 |
| Leucine | 4.51 ± 0.08 | 4.44 ± 0.01 | 4.68 ± 0.05 | 4.46 ± 0.02 | 4.56 ± 0.01 |
| Lysine | 3.09 ± 0.19 | 3.09 ± 0.01 | 3.02 ± 0.17 | 2.94 ± 0.01 | 2.97 ± 0.03 |
| Threonine | 2.32 ± 0.03 | 2.37 ± 0.00 | 2.31 ± 0.03 | 2.14 ± 0.05 | 2.15 ± 0.02 |
| Valine | 2.75 ± 0.00 | 2.87 ± 0.02 | 3.00 ± 0.03 | 3.08 ± 0.01 | 3.18 ± 0.01 |

TABLE 4-continued

Amino acid profile of the experimental diets.

| Amino acids | CTRL | Y5 | Y7.5 | Y15 | Y25 |
| --- | --- | --- | --- | --- | --- |
| Methionine | 1.71 ± 0.15 | 1.71 ± 0.01 | 1.75 ± 0.06 | 1.74 ± 0.02 | 1.63 ± 0.02 |
| Cysteine | 0.35 ± 0.02 | 0.34 ± 0.00 | 0.31 ± 0.02 | 0.33 ± 0.00 | 0.34 ± 0.00 |
| Phenylalanine | 3.30 ± 0.00 | 3.06 ± 0.01 | 2.92 ± 0.15 | 2.85 ± 0.01 | 2.56 ± 0.00 |
| Tyrosine | 2.44 ± 0.11 | 2.48 ± 0.00 | 2.67 ± 0.14 | 2.92 ± 0.04 | 3.14 ± 0.12 |
| Taurine | 0.20 ± 0.01 | 0.20 ± 0.00 | 0.21 ± 0.01 | 0.06 ± 0.00 | 0.04 ± 0.00 |

The contents are indicated in % by weight relative to the total weight of granules before drying.

TABLE 5

Synthesis of the fatty acid profile of the experimental diets.

| Fatty acids | CTRL | Y5 | Y7.5 | Y15 | Y25 |
| --- | --- | --- | --- | --- | --- |
| C14:0 | 0.40 ± 0.00 | 0.40 ± 0.00 | 0.38 ± 0.00 | 0.43 ± 0.00 | 0.38 ± 0.00 |
| C16:0 | 1.86 ± 0.01 | 1.89 ± 0.01 | 1.82 ± 0.02 | 2.11 ± 0.01 | 1.94 ± 0.02 |
| C16:1n-7 | 0.48 ± 0.00 | 0.48 ± 0.00 | 0.44 ± 0.00 | 0.50 ± 0.00 | 0.42 ± 0.01 |
| C18:0 | 0.49 ± 0.00 | 0.50 ± 0.01 | 0.47 ± 0.01 | 0.54 ± 0.00 | 0.50 ± 0.01 |
| C18:1n-9 | 1.62 ± 0.01 | 1.74 ± 0.01 | 1.69 ± 0.01 | 2.08 ± 0.01 | 2.06 ± 0.02 |
| C18:1n-7 | 0.26 ± 0.00 | 0.25 ± 0.01 | 0.23 ± 0.00 | 0.25 ± 0.00 | 0.21 ± 0.00 |
| C18:2n-6 | 0.79 ± 0.00 | 0.94 ± 0.01 | 1.05 ± 0.01 | 1.36 ± 0.01 | 1.53 ± 0.02 |
| C18:3n-3 | 0.13 ± 0.00 | 0.13 ± 0.00 | 0.13 ± 0.00 | 0.14 ± 0.00 | 0.12 ± 0.00 |
| C18:4n-3 | 0.10 ± 0.00 | 0.10 ± 0.00 | 0.09 ± 0.00 | 0.10 ± 0.00 | 0.08 ± 0.00 |
| C20:1n-9 | 0.20 ± 0.00 | 0.19 ± 0.00 | 0.17 ± 0.00 | 0.18 ± 0.00 | 0.14 ± 0.00 |
| C20:4n-6 | 0.14 ± 0.00 | 0.13 ± 0.00 | 0.12 ± 0.00 | 0.14 ± 0.00 | 0.12 ± 0.00 |
| C20:5n-3 | 0.72 ± 0.00 | 0.71 ± 0.01 | 0.65 ± 0.00 | 0.70 ± 0.00 | 0.57 ± 0.01 |
| C22:1n-11 | 0.14 ± 0.00 | 0.13 ± 0.00 | 0.11 ± 0.00 | 0.12 ± 0.00 | 0.08 ± 0.00 |
| C22:5n-3 | 0.14 ± 0.00 | 0.13 ± 0.00 | 0.12 ± 0.00 | 0.13 ± 0.00 | 0.10 ± 0.00 |
| C22:6n-3 | 1.45 ± 0.01 | 1.44 ± 0.01 | 1.33 ± 0.01 | 1.46 ± 0.01 | 1.21 ± 0.02 |

The contents are indicated in % by weight relative to the total weight of granules before drying.

1.3. Growth Performance Test

Triplicate groups of 35 rainbow trout (*Oncorhynchus mykiss*), with an initial body weight (IBW) of 5.01±0.1 g were fed with one of the five experimental diets for 90 days. The fish grew in circular glass-fibre tanks (volume: 250 L) supplied with a continuous flow of fresh water at temperatures comprised between 14.1±0.3° C. and levels of dissolved oxygen above 7.4 mg/L (see FIG. 1). The fish were subjected to summer conditions with natural photoperiod changes (May-July). The fish were hand-fed to apparent satiation, three times a day (9 h00, 14 h00 and 18 h00) during the week and twice a day at week-ends (10 h00 and 16 h00), taking the greatest care to avoid wasting the feed. The feed distributed was quantified throughout the length of the study. Anaesthetized fish were weighed individually at the start and at the end of the study and the group was weighed on day 28 and on day 60. At the start, 15 fish of the same initial stock were sampled and stored at −20° C. for subsequent analysis of the whole body composition. After 90 days of experimental feeding, 6 fish from each tank were sampled for the same purpose.

1.4. Apparent Digestibility Measurement

At the end of the growth test and following all the associated samplings, 12 fish (body weight: 45 g) from each replica tank were used to determine the apparent digestibility of the dry matter, proteins, lipids, energy and phosphorus, by the indirect method with identical diets containing yttrium oxide (200 mg/kg) as inert tracer. The fish were stored in cylindro-conical tanks (volume: 60 L; water flow rate: 3.7 L/min; levels of dissolved oxygen greater than 6.4 mg/L), at a constant water temperature of 14° C. The fish were adapted to the farming conditions and to the experimental diets over 10 days. Then, the fish were hand-fed once a day (10 h00), to slight excess. After deep cleaning of the rearing tanks to remove all the feed residues, the faecal matter was collected daily for the following 8 days using the continuous outlet water filtration system (Choubert-INRA system). After daily collection, the faecal matter was frozen at −20° C. The mixed faecal matter originating from each group of fish was lyophilized before analysis. Each diet was tested in triplicate.

The apparent digestibility coefficients (ADC) of the nutrients and of the feed energy in the experimental diets were calculated according to the formula:

$$ADC(\%) = 100 - \left[ \frac{\%\ \text{concentration}\ Y_2O_3\ \text{feed}}{\%\ \text{concentration}\ Y_2O_3\ \text{faeces}} \times \frac{\%\ \text{Energy or nutrients in faeces}}{\%\ \text{Energy or nutrients in feed}} \right]$$

1.5. Analytical Methods

The test ingredients, the diets and the lyophilized faecal matter were ground before analysis. The whole-body samples were chopped, mixed, and a representative sample was lyophilized and homogenized with a laboratory mill before analysis. The analysis of the chemical composition of the ingredient, diets, faecal matter and whole fish was carried out using the following procedures: dry matter after drying at 105° C. for 24 h; ash by combustion at 550° C. for 12 h; crude protein (N×6.25) by a flash combustion technique followed by separation by gas chromatography and thermal conductivity detection (LECO FP428); the fat by extraction with dichloromethane (Soxhlet); the total phosphorus according to the ISO/DIS 6491 method using vanadomolybdic reagent; the crude energy in a adiabatic bomb calorimeter. The yttrium oxide in the feeds and the faeces was determined by the ICP-AES method.

For analyses of total amino acids, the test ingredients and the test diets were hydrolysed (6 M of HCL at 116° C. for 22 h in glass flasks rinsed with nitrogen), then derivatized with an AccQ (6-aminoquinolyl-N-hydroxysuccinimidyl) fluorine reagent according to the AccQ-Tag method (Waters, USA). The analyses were carried out by high performance liquid chromatography (HPLC) in a reverse-phase amino acid analysis system, using norvaline as internal standard. The tryptophan was not determined as it is partially destroyed by acid hydrolysis. The resulting peaks were analysed with EMPOWER software (Waters, USA). For the analysis of the fatty acids, the lipids were extracted according to the method of Folch et al. (1957) and subsequently, the fatty acid composition of the fillets was determined by analysis of the methyl esters by gas chromatography, according to the Lepage and Roy procedure (1986).

1.6. Criterion for Evaluating Growth and Use of the Nutrients

IBW (g): Initial body weight.

FBW (g): Final body weight.

Specific growth rate, SGR (%/day): (Ln FBW−Ln IBW)×100/days.

Feed conversion ratio, FCR: gross feed ration/weight gain.

Voluntary feed intake, VFI (% BW/day): (gross feed ration/(IBW+FBW)/2/days)×100.

Protein efficiency ratio PER: wet weight gain/crude protein intake.

Retention (% of intake): 100×(FBW×final nutrients content in the carcass−IBW×initial nutrients content in the carcass)/nutrient intake.

1.7. Statistical Analysis

The data are presented by the average of three repetitions±the standard deviation. The data were subjected to one-factor analysis of variance. Before ANOVA, the values expressed in % were subjected to an arcsine square root transformation. The statistical significance was tested at a probability level of 0.05. All the statistical tests were carried out using IBM SPSS V21 software.

2. Results 2.1. Growth Performance

The data on the growth performances, feed conversion and protein efficiency of the rainbow trout fed with the experimental diets for 28, 60 and 90 days are reported in Tables 6-8 and FIG. 2. No deaths occurred during the test.

TABLE 6

Growth performances on day 28.

| Regime | CTRL | Y5 | Y7.5 | Y15 | Y25 |
|---|---|---|---|---|---|
| IBW (g) | 5.0 ± 0.1 | 4.9 ± 0.1 | 5.0 ± 0.1 | 5.1 ± 0.1 | 5.1 ± 0.1 |
| FBW (g) | 16.1 ± 0.1$^a$ | 16.2 ± 0.5$^a$ | 16.2 ± 0.5$^a$ | 17.9 ± 0.3$^b$ | 17.6 ± 0.4$^b$ |
| SGR, %/d | 4.19 ± 0.12$^a$ | 4.26 ± 0.13$^a$ | 4.20 ± 0.07$^a$ | 4.50 ± 0.07$^b$ | 4.45 ± 0.06$^b$ |
| FCR | 0.87 ± 0.01$^b$ | 0.87 ± 0.02$^b$ | 0.87 ± 0.03$^b$ | 0.81 ± 0.00$^a$ | 0.81 ± 0.01$^a$ |
| Feed intake, % BWM/d | 3.27 ± 0.07 | 3.31 ± 0.09 | 3.28 ± 0.09 | 3.25 ± 0.03 | 3.22 ± 0.07 |
| PER | 2.55 ± 0.02$^a$ | 2.56 ± 0.05$^a$ | 2.55 ± 0.08$^a$ | 2.66 ± 0.01$^{ab}$ | 2.72 ± 0.05$^b$ |

The values are the averages ± the standard deviation (n = 3).
The values within a row with different exponents differ significantly (P < 0.05).

After 28 days of experimental feeding (Table 6), the fish have more than tripled their initial body weight. The feed intake was high (3.22-3.31% BWM/day) and was not affected (P>0.05) by the increasing doses of beetle powder incorporated. This observation suggests that the beetle powder had no negative effect on palatability, and even that it could compensate for the total elimination of fishmeal without compromising the feed intake. The growth rate varied from 4.19 to 4.50%/day. In comparison with the CTRL treatment, while the Y5 and Y7.5 diets did not affect the FBW and the SGR, the Y15 and Y25 diets led to a significant increase (P<0.05) in FBW and SGR. The values of the feed conversion ratio vary between 0.81 and 0.87. In comparison with the CTRL, the inclusion of beetle powder at 5 and 7.5% (Y5 and Y7.5 diets) did not affect the FCR. However, the high levels of inclusion of beetle powder (Y15 and Y25 diets) led to a significant reduction in FCR (P<0.05). The protein efficiency ratio (PER) varied between 2.55 and 2.72. The fish fed with a Y25 diet showed a significant increase in PER, compared with those fed with the CTRL, Y5 and Y7.5 diets.

TABLE 7

Growth performances on day 60.

| Diet | CTRL | Y5 | Y7.5 | Y15 | Y25 |
|---|---|---|---|---|---|
| IBW (g) | 5.0 ± 0.1 | 4.9 ± 0.1 | 5.0 ± 0.1 | 5.1 ± 0.1 | 5.1 ± 0.1 |
| FBW (g) | 30.3 ± 0.1$^a$ | 31.6 ± 0.5$^a$ | 34.9 ± 1.5$^b$ | 37.2 ± 0.9$^c$ | 42.9 ± 0.4$^d$ |

TABLE 7-continued

Growth performances on day 60.

| Diet | CTRL | Y5 | Y7.5 | Y15 | Y25 |
|---|---|---|---|---|---|
| SGR, %/d | 3.00 ± 0.04$^a$ | 3.10 ± 0.04$^b$ | 3.24 ± 0.04$^c$ | 3.31 ± 0.05$^c$ | 3.57 ± 0.04$^d$ |
| FCR | 1.10 ± 0.03$^d$ | 1.02 ± 0.03$^c$ | 0.92 ± 0.01$^b$ | 0.90 ± 0.02$^b$ | 0.85 ± 0.02$^a$ |
| PER | 2.01 ± 0.06$^a$ | 2.17 ± 0.06$^b$ | 2.40 ± 0.02$^c$ | 2.46 ± 0.06$^{cd}$ | 2.56 ± 0.07$^d$ |

The values are the averages ± the standard deviation (n = 3).
The values within a row with different exponents differ significantly (P < 0.05).

After 60 days of experimental feeding (Table 7), the fish undergoing the most effective treatment showed an increase of 8 times the initial body weight. The growth level varied from 3.00 to 3.57%/day. In comparison with the CTRL treatment, all the diets with the beetle powder showed a significant increase (P<0.05) in SGR. The FCR values varied between 0.85 and 1.10 and in comparison with the CTRL, the inclusion of the beetle powder at all the doses tested led to a significant reduction in FCR (P<0.05). The protein efficiency ratio (PER) varied between 2.01 and 2.56. The lowest PER value was found in the fish fed with a CTRL diet, while an improvement in PER was closely associated with increasing doses of the beetle powder

TABLE 8

Growth performances on day 90.

| Diet | CTRL | Y5 | Y7.5 | Y15 | Y25 |
|---|---|---|---|---|---|
| IBW (g) | 5.0 ± 0.1 | 4.9 ± 0.1 | 5.0 ± 0.1 | 5.1 ± 0.1 | 5.1 ± 0.1 |
| FBW (g) | 42.9 ± 1.3$^a$ | 45.2 ± 1.0$^b$ | 49.0 ± 0.6$^c$ | 51.0 ± 1.4$^c$ | 55.9 ± 1.0$^d$ |
| SGR, %/d | 2.39 ± 0.06$^a$ | 2.47 ± 0.02$^b$ | 2.54 ± 0.03$^b$ | 2.56 ± 0.05$^b$ | 2.67 ± 0.04$^c$ |
| FCR | 0.93 ± 0.02$^b$ | 0.83 ± 0.03$^a$ | 0.80 ± 0.02$^a$ | 0.79 ± 0.04$^a$ | 0.79 ± 0.02$^a$ |
| PER | 2.38 ± 0.06$^a$ | 2.68 ± 0.10$^b$ | 2.76 ± 0.06$^b$ | 2.80 ± 0.15$^b$ | 2.74 ± 0.08$^b$ |

The values are the averages ± the standard deviation (n = 3).
The values within a row with different exponents differ significantly (P < 0.05).

At the end of the test, 90 days of experimental feeding (Table 8), the fish undergoing the most effective treatment showed an increase of 11 times the initial body weight. In comparison with the CTRL fish, those fed with the diets rich in insects showed a significant increase in final body weight (P<0.05). This increase was dose-related, with a moderate increase for the Y5 diet, intermediate for Y7.5 and Y15, and highest for Y25. The specific growth rate (SGR) varied between 2.39 and 2.67%/day, with a minimal value found in the fish fed with a CTRL diet, while those fed with feeds containing beetle powder showed significantly higher SGR values (p<0.05). Independently of the level of incorporation, the beetle powder led to a significant reduction in FCR (P<0.05). In comparison with the CTRL treatment, all the diets comprising meals of insects led to a significant increase in the PER values (P<0.05).

2.2. Composition of the Whole Body

The data on the composition of the whole body of the trout at the end of the test are presented in Table 9. The feeding treatments had no effect (P>0.05) on the moisture, protein, lipid, ash, phosphorus and energy levels of the whole fish.

TABLE 9

Composition of the whole body of the trout fed with the various feed treatments.

| Body composition | CTRL | Y5 | Y7.5 | Y15 | Y25 |
|---|---|---|---|---|---|
| Moisture, % | 70.1 ± 0.6 | 70.7 ± 0.4 | 71.1 ± 0.4 | 70.5 ± 0.5 | 70.7 ± 1.2 |
| Protein, % | 14.8 ± 0.6 | 14.8 ± 0.3 | 15.0 ± 0.5 | 15.2 ± 0.3 | 15.2 ± 0.7 |
| Fat, % | 12.2 ± 0.2 | 11.5 ± 0.4 | 11.0 ± 0.3 | 11.6 ± 0.1 | 11.8 ± 0.9 |
| Ash, % | 1.9 ± 0.0 | 2.2 ± 0.2 | 2.1 ± 0.3 | 2.1 ± 0.0 | 2.2 ± 0.1 |
| Phosphorus, % | 0.4 ± 0.0 | 0.4 ± 0.0 | 0.4 ± 0.0 | 0.4 ± 0.0 | 0.4 ± 0.0 |
| Energy, kJ/g | 8.2 ± 0.1 | 8.0 ± 0.0 | 8.0 ± 0.0 | 8.0 ± 0.2 | 8.2 ± 0.4 |

*The percentages are percentages by weight relative to the total weight of the fish.
The values are the averages ± the standard deviation (n = 3).
Initial fish: moisture 75.0%; protein 14.1%; fats 8.7%; ash 2.2%; phosphorus 0.4%, energy 6.7 kJ/g.

2.3. Nutrient Retention

The nutrient and energy retention values (expressed in percentage of intake) are presented in Table 10. In comparison with the CTRL treatment, the fish fed with diets rich in beetle powder showed a significant increase in protein and energy retention (P<0.05). Similarly, the Y7.5, Y15 and Y25 diets showed a P retention significantly higher than the CTRL (P<0.05). Fat retention was not affected by the diets (P>0.05).

TABLE 10

Nutrient and energy retention in the trout fed with the various diets.

| Retention, % intake | CTRL | Y5 | Y7.5 | Y15 | Y25 |
|---|---|---|---|---|---|
| Protein | $35.5 \pm 2.5^a$ | $39.8 \pm 0.7^b$ | $41.6 \pm 0.4^b$ | $42.8 \pm 2.2^b$ | $41.9 \pm 2.2^b$ |
| Fat | $64.4 \pm 2.1$ | $68.0 \pm 4.9$ | $66.8 \pm 3.3$ | $71.5 \pm 3.4$ | $70.9 \pm 6.7$ |
| Phosphorus | $30.5 \pm 0.7^a$ | $32.7 \pm 1.8^{ab}$ | $34.0 \pm 0.7^b$ | $33.9 \pm 1.7^b$ | $33.8 \pm 1.1^b$ |
| Energy | $42.0 \pm 0.8^a$ | $45.4 \pm 1.6^b$ | $47.1 \pm 1.4^b$ | $47.8 \pm 1.8^b$ | $48.0 \pm 2.9^b$ |

The values are the averages ± the standard deviation (n = 3).
The values within a row with different exponents differ significantly (P < 0.05).

2.4. Apparent Digestibility

The composition of the faecal matter collected from the trout fed with the various feed treatments is presented in Table 11.

TABLE 11

Composition of the faecal matter of the trout fed with the various diets.

| Composition of faecal matter | CTRL | Y5 | Y7.5 | Y15 | Y25 |
|---|---|---|---|---|---|
| Yttrium oxide, (mg/kg) | $1384 \pm 39$ | $1395 \pm 94$ | $1415 \pm 61$ | $1369 \pm 62$ | $1411 \pm 43$ |
| Protein, % DM* | $19.63 \pm 0.06$ | $19.67 \pm 0.24$ | $19.76 \pm 0.34$ | $19.70 \pm 0.38$ | $19.20 \pm 0.41$ |
| Fats, % DM* | $4.37 \pm 0.06$ | $4.33 \pm 0.19$ | $4.28 \pm 0.24$ | $4.30 \pm 0.06$ | $4.20 \pm 0.33$ |
| Phosphorus, % DM* | $2.64 \pm 0.06$ | $2.77 \pm 0.08$ | $2.65 \pm 0.10$ | $2.54 \pm 0.15$ | $2.62 \pm 0.09$ |
| Energy, kJ/g DM | $23.24 \pm 0.16$ | $23.14 \pm 0.40$ | $23.47 \pm 0.47$ | $22.88 \pm 0.16$ | $23.09 \pm 0.16$ |

*% by weight relative to the total weight of dry matter in faecal matter.
The values are the averages ± the standard deviation (n = 3).

The apparent digestibility coefficients (ADC %) for the different nutrients and energy are presented in Table 12. The increase in the doses of beetle powder incorporated had no significant effect (P>0.05) on the apparent digestibility of the dry matter, proteins, fat, phosphorus and energy.

TABLE 12

Apparent digestibility of the nutrients and energy in the trout.

| ADC, % | CTRL | Y5 | Y7.5 | Y15 | Y25 |
|---|---|---|---|---|---|
| Dry matter | $84.2 \pm 0.4$ | $84.2 \pm 1.0$ | $84.3 \pm 0.7$ | $84.0 \pm 0.7$ | $84.3 \pm 0.5$ |
| Protein | $93.6 \pm 0.2$ | $93.6 \pm 0.4$ | $93.6 \pm 0.2$ | $93.5 \pm 0.4$ | $93.8 \pm 0.1$ |
| Fat | $97.0 \pm 0.1$ | $97.0 \pm 0.1$ | $97.0 \pm 0.2$ | $97.0 \pm 0.2$ | $97.1 \pm 0.3$ |
| Phosphorus, % of intake | $69.9 \pm 1.4$ | $68.3 \pm 1.5$ | $70.5 \pm 2.4$ | $71.4 \pm 2.9$ | $70.3 \pm 1.8$ |
| Energy, % of intake | $84.1 \pm 0.4$ | $84.3 \pm 0.8$ | $84.1 \pm 1.0$ | $84.2 \pm 0.6$ | $84.4 \pm 0.6$ |

The values are the averages ± the standard deviation (n = 3).

3. Conclusion

At the end of 90 days of experimental feeding, the overall growth performance can be considered as very satisfactory and in a higher range for the young rainbow trout, with SGR values for the total duration of the test varying between 2.4 and 2.7%/day. In the most effective treatments, the fish showed an increase of 11 times their initial body weight. The feed conversion rate among the treatments varied between 0.79 and 0.93, which suggests a good nutritional adequacy of the feeds and good feeding practices.

The experimental data generated in this example make it possible to affirm that:
The incorporation of increasing doses of beetle powder (5, 7.5, 15 and 25%) with a concomitant reduction in fishmeal was progressively linked to a significant increase in the body weight of the fish.
All the diets containing the beetle powder showed a significant improvement in SGR, FCR and PER.
The increasing doses of beetle powder incorporated had no effect on the composition of the whole body of the trout.
The increasing doses of beetle powder incorporated had no effect on the apparent digestibility of the dry matter, proteins, lipids, phosphorus and energy in the different experimental diets.
The proteins, the phosphorus and energy retention were enhanced in trout fed with feeds comprising beetle powder.

In general, the beetle powder utilized in this example could effectively replace 100% of the fishmeal in the diet of juvenile rainbow trout with positive effects on FCR and overall growth performance.

Example 5: Methods With or Without Grinding Prior to Pressing

Method with Pressing Only 200 g of *T. molitor* larvae are introduced into a beaker, placed in a water bath at 100° C. and containing 200 mL of water brought to the boil beforehand. After 5 minutes, the beaker is removed from the water bath, the larvae are drained, then passed into a twin-screw-type press. A press cake is thus obtained.

Method with Grinding Followed by Pressing 200 g of *T. molitor* larvae are introduced into a beaker, placed in a water bath at 100° C. and containing 200 mL of water brought to the boil beforehand. After 5 minutes, the beaker is removed from the water bath, the larvae are drained, then mixed with a volume of water of 200 mL. The liquid thus obtained is passed into a twin-screw-type press. A press cake is thus obtained.

Measurement of the Lipid Content 2 g of sample is placed in a beaker to which 0.2 g of $Na_2SO_4$ and 15 mL of $CHCl_3$/MeOH (2/1 v/v) are added. The mixture is placed under magnetic stirring for 20 minutes, then the solution is filtered, the residue is again placed in the beaker with 10 mL of $CHCl_3$/MeOH (2/1 v/v). The mixture is placed under magnetic stirring for 15 minutes, then the solution is filtered, the solvent phases are combined and evaporated to constant weight. The lipid content is determined as a percentage by weight after extraction-evaporation relative to the initial weight of the sample (2 g).

Conclusion

The significance of grinding upstream of pressing was studied (FIG. 3). It is thus clearly apparent that the distribution of the lipids between the press cake and the press juice is much more effective, 12.9 versus 87.1 as opposed to 42.7 versus 57.3, when grinding was carried out beforehand.

Example 6: Analysis of the Size of the Soluble Proteins of the Beetle Powder According to the Invention A sample of 100 mg of the beetle powder prepared in Example 1 was placed in 10 mL of NaCl phosphate buffer (pH 7.4, 0.137 mM). The sample was stirred for 1 minute (vortex), then centrifuged at 900 g for 1 min. After centrifugation, the sample was filtered through a 0.45 μm membrane. Analysis of the size of the soluble proteins was carried out using a steric exclusion chromatography system with a Nucleogel GFC-300 column. An NaCl phosphate buffer (pH 7.4, 0.137 mM) was used as eluent. The flow rate was 1.0 mL/min. Detection was carried out with a UV detector at 280 nm.

The results of the analysis are presented in FIG. 4 and summarized in Table 13 below.

TABLE 13

Distribution of the sizes of the soluble proteins contained in the beetle powder prepared in Example 1

| Size of the proteins (kg/mol) | Relative abundance (%) |
|---|---|
| 6.5 to 12.4 | 74.4 |
| 12.4 to 29 | 20.5 |
| 29 to 66 | 5.1 |

The results show that approximately 74.4% of the soluble proteins present in the beetle powder according to the invention have a molar mass of less than 12,400 g/mol (or Da, Daltons).

The invention claimed is:

1. Beetle powder comprising at least 67% by weight proteins, at least 5% by weight chitin, and a fat content between 5 and 20% by weight, the percentages by weight being given relative to the total weight of beetle powder, wherein the residual moisture content is between 2 and 15%.

2. Beetle powder according to claim 1, comprising ash in a content less than or equal to 4% by weight relative to the total weight of beetle powder.

3. Beetle powder according to claim 1, the proteins of which exhibit a digestibility greater than or equal to 85%.

4. Beetle powder according to claim 1, comprising between 40 and 60% by weight soluble proteins relative to the total weight of proteins, in which at least 50% of the soluble proteins have a molar mass less than or equal to 12,400 g/mol.

5. Beetle powder according to claim 1, wherein said fat content is 9% to 17% by weight relative to the total weight of beetle powder.

6. A method for the preparation of a beetle powder according to claim 1, comprising the following steps:
 i) killing the beetles,
 ii) pressing the beetles in order to obtain a press cake, and
 iii) grinding the press cake.

7. The method according to claim 6, further comprising a step of drying the press cake.

8. The method according to claim 6, wherein the method further comprises a step of drying the press cake and before the grinding step and wherein the pressing step is preceded by a step of grinding the beetles.

9. The method according to claim 6, wherein the method further comprises a step of drying the press cake before the grinding step and wherein the pressing step is carried out hot.

10. The method according to claim 6, wherein the method further comprises a step of drying the press cake before the grinding step and wherein the step of grinding the press cake is carried out to a particle size comprised between 300 μm and 1 mm.

11. A feed for a human or an animal comprising the beetle powder according to claim 1.

12. The feed according to claim 11, in which the beetle powder is used to replace protein flour.

13. The feed according to claim 11, wherein said animal is a dog or a cat.

* * * * *